United States Patent [19]
Terai

[11] Patent Number: 4,957,267
[45] Date of Patent: Sep. 18, 1990

[54] SEAT SLIDE DEVICE

[75] Inventor: Masanori Terai, Kanagawa, Japan

[73] Assignee: Ikeda Bussan Co., Ltd., Ayase, Japan

[21] Appl. No.: 320,495

[22] Filed: Mar. 8, 1989

[30] Foreign Application Priority Data

Jul. 28, 1988 [JP] Japan .................. 63-100556[U]

[51] Int. Cl.⁵ .................................. F16M 13/00
[52] U.S. Cl. ................................. 248/430; 384/47
[58] Field of Search ............. 248/430, 429, 420; 297/341; 384/47

[56] References Cited

U.S. PATENT DOCUMENTS

| | | | |
|---|---|---|---|
| 3,866,876 | 2/1975 | Adams | 248/429 |
| 4,232,895 | 11/1980 | Yoshio et al. | 296/65 |
| 4,238,099 | 12/1980 | Hunwicks | 248/430 |
| 4,556,186 | 12/1985 | Langmesser, Jr. et al. | 248/429 |
| 4,787,667 | 11/1988 | Nishino | 248/430 Y |
| 4,852,846 | 8/1989 | Weier | 248/430 |

FOREIGN PATENT DOCUMENTS

| | | |
|---|---|---|
| 100880 | 2/1984 | Fed. Rep. of Germany . |
| 1077171 | 11/1954 | France . |
| 648183 | 1/1951 | United Kingdom ........... 248/429 |
| 1546166 | 5/1979 | United Kingdom . |

Primary Examiner—Alvin C. Chin-Shue
Attorney, Agent, or Firm—Foley & Lardner, Schwartz, Jeffery, Schwaab, Mack, Blumenthal & Evans

[57] ABSTRACT

Herein disclosed is a seat slide device which comprises a lower rail including a channel portion with first and second side walls; an upper rail longitudinally slidably disposed on the lower rail, the upper rail having a major flat wall portion which faces the channel portion when the upper rail is properly disposed on the lower rail; and first and second lugs projected from the major flat wall portion of the upper rail into the channel portion of the lower rail. The first and second lugs are located in the vicinity of inner surfaces of the first and second side walls of the lower rail, respectively, so that undesired lateral play of the upper rail relative to the lower rail is suppressed.

16 Claims, 3 Drawing Sheets

SEAT SLIDE DEVICE

BACKGROUND OF THE INVENTION

1. Field of the Invention

The present invention relates in general to seat slide devices of a motor vehicle, and more particularly to seat slide devices of a type which comprises a pair of lower rails secured to a vehicle floor and a pair of upper rails slidably disposed on the lower rails and mounting thereon a seat.

2. Description of the Prior Art

Hitherto, various types of seat slide devices have been proposed and put into practical use particularly in the field of motor vehicles. In the devices, there is a type which comprises a pair of lower rails secured to a floor, a pair of upper rails slidably disposed on the lower rails and mounting thereon a seat mounted thereon, and a plurality of balls rotatably disposed between mated pairs of the lower and upper rails for smoothing the movement of the upper rails relative to the lower rails.

However, some of the seat slide devices of such type have suffered from a drawback due to their inherent constructions.

That is, some of the seat slide devices have been constructed without giving a considerable thought on the construction by which a lateral play of the upper rails relative to the lower rails is effectively suppressed. In fact, during movement of the vehicle, the seat slide devices of such type causes uncomfortable lateral play of the seat mounted thereon relative to the vehicle floor. Such play sometimes produces unpleasant noises.

SUMMARY OF THE INVENTION

It is therefore an object of the present invention to provide a seat slide device which is free of the above-mentioned drawbacks.

According to the present invention, there is provided a seat slide device in which a structure is employed by which an uncomfortable lateral play of the upper rails relative to the lower rails is assuredly suppressed.

According to one aspect of the present invention, there is provided a seat slide device which comprises a lower rail including a channel portion with first and second side walls; an upper rail longitudinally slidably disposed on the lower rail, the upper rail having a major flat wall portion which faces the channel portion when the upper rail is properly disposed on the lower rail; and first and second lugs projected from the major flat wall portion of the upper rail into the channel portion of the lower rail, the first and second lugs being located in the vicinity of inner surfaces of the first and second side walls of the lower rail, respectively.

According to another aspect of the present invention, there is provided a seat slide device which comprises two slider units which are substantially the same in construction and arranged in parallel with each other, each slider unit including a lower rail including a channel portion with first and second side walls, an upper rail longitudinally slidably disposed on the lower rail, the upper rail having a major flat wall portion which faces the channel portion when the upper rail is properly disposed on the lower rail, and first and second lugs projected from the major flat wall portion of the upper rail into the channel portion of the lower rail, the first and second lugs being located in the vicinity of inner surfaces of the first and second side walls of the lower rail, respectively; and two locking mechanisms constructed to lock the upper rails relative to the lower rails; and a lock releaser incorporated with the two locking mechanisms and cancelling the locked condition of the upper rails when manipulated.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
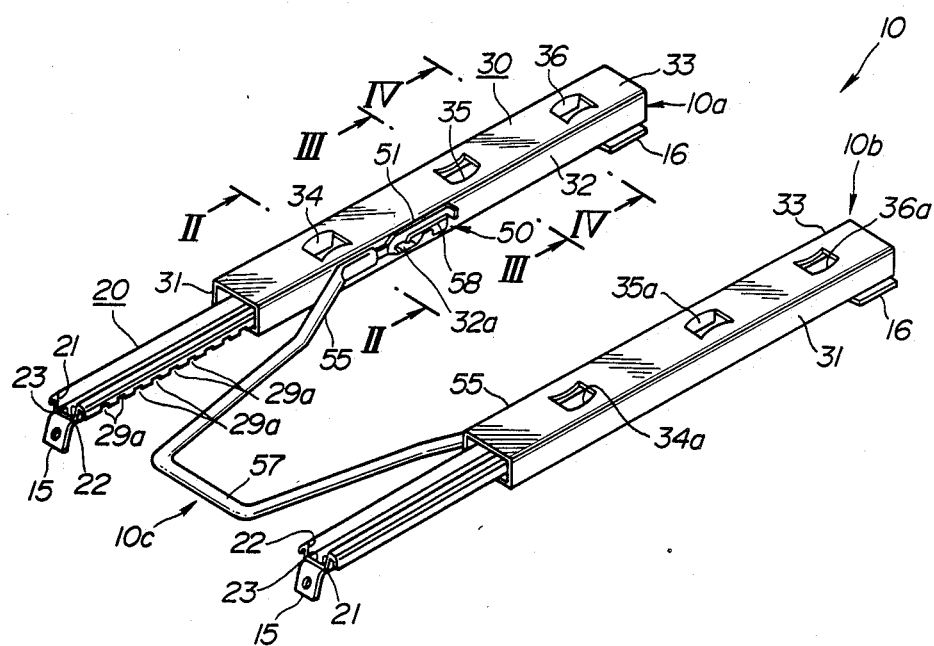
FIG. 1 is a perspective view of a seat slide device according to the present invention.

Referring to FIGS. 1 to 5, particularly FIG. 1, there is shown a seat slide device 10 according to the present invention.

As is seen from FIG. 1, the seat slide device 10 comprises generally two slider units 10a and 10b, lock mechanisms 50 respectively associated with the two slider units 10a and 10b and a lock releaser 10c.

Since the two slider units 10a and 10b are substantially the same in construction except for small things caused by the symmetrical arrangement therebetween, the following description of the slider units 10a and 10b will be made only with respect to the slider unit 10a which is to be positioned at right side when mounted on a vehicle floor.

The slider unit 10a comprises a lower rail 20 which is connected to the vehicle floor and an upper rail 30 which is slidably disposed on the lower rail 20 and mounts thereon a seat (not shown). As will become apparent as the description proceeds, the upper rail 30 is arranged to cover the lower rail 20.

As is seen from FIG. 1, the lower rail 20 has at its front and rear ends respective brackets 15 and 16 secured to the vehicle floor.

Figure 2:
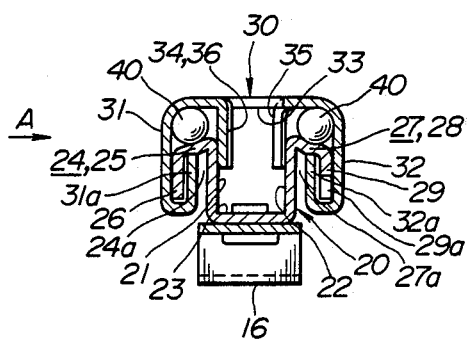
FIG. 2 is a sectional, but enlarged, view taken along the line II—II of FIG. 1.
Figure 3:
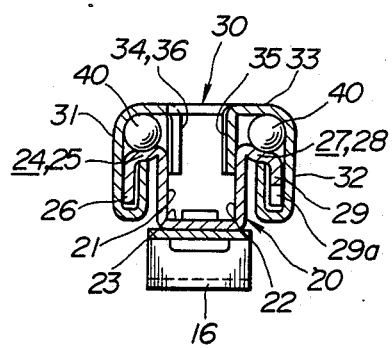
FIG. 3 is a sectional, but enlarged, view taken along the line III—III of FIG. 1.
Figure 4:
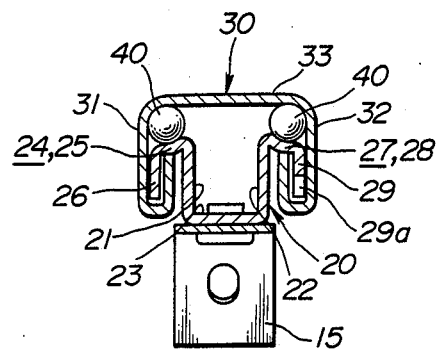
FIG. 4 is a sectional, but enlarged, view taken along the line IV—IV of FIG. 1.

As is seen from FIGS. 2, 3 and 4, the lower rail 20 comprises a channel portion 23 having side walls 21 and 22, and outward flanges 24 and 27 extending outward from tops of the respective side walls 21 and 22. Each outward flange 24 or 27 includes an outwardly extending inclined portion 25 or 28 and a downwardly extending vertical portion 26 or 29. Thus, a longitudinally extending slot 24a or 27a is defined between the side wall 21 or 22 and the associated side flange 24 or 27. The outwardly extending inclined portion 25 or 28 is formed at its upper surface with a longitudinally extending shallow guide groove (no numeral) along which ball bearings 40 run as will be described in detail hereinafter.

The vertical portion 29 of the side flange 27 is formed with a plurality of notches 29a which constitute part of the lock mechanism 50 which will be described in detail hereinafter.

The upper rail 30 comprises a channel portion 33 having side walls 31 and 32. Each side wall 31 or 32 has an inwardly turned flange 31a or 32a. Each side wall 31 or 32 and the major flat wall portion (no numeral) of the upper rail 30 constitute at their joined curved portion a longitudinally extending guide way along which the ball bearings 40 run as will be described in the following.

As will be understood from FIGS. 2, 3 and 4, the upper rail 30 is slidably mounted on the lower rail 20 having the inwardly turned flanges 31a and 32a slidably disposed in the longitudinally extending slots 24a and 27a of the lower rail 20, and the ball bearings 40 are rotatably disposed between each guide groove of the lower rail 20 and the associated guide way of the upper rail 30, as shown.

Thus, the upper rail 30 can smoothly slide forward and rearward on and along the lower rail 20 by the provision of the ball bearings 40.

In accordance with the present invention, the following measure is further employed, which suppresses or at least minimizes undesired lateral play of the upper rail 30 relative to the lower rail 20.

That is, as is seen from FIG. 1, the flat major wall portion of the upper rail 30 has three longitudinally spaced apertured areas where respective parts of the major wall portion are partially cut and bent down to form front, middle and rear lugs 34, 35 and 36 which are projected into the inside of the upper rail 30. The lugs are shaped like a plate and the major surface (34a, 35a, 36a) of the plate faces the inner surface of the corresponding side wall (21, 22) of the lower rail (20) generally parallel. The front and rear lugs 34 and 36 are arranged to slidably contact with the side wall 21 of the lower rail 20, while the middle lug 35 is arranged to slidably contact with the other side wall 22 of the lower rail 20. Preferably, the three lugs 34, 35 and 36 are positioned at equally spaced intervals.

Figure 5:
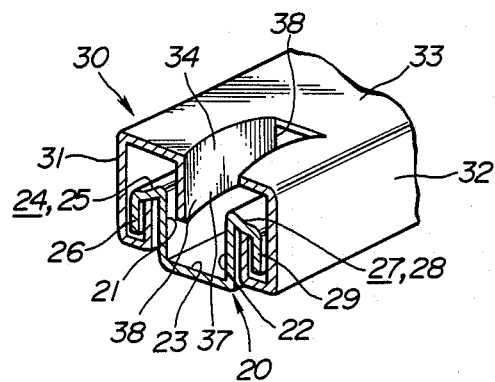
FIG. 5 is a partially cut perspective view of the seat slide device showing a part where a measure according to the present invention is employed.

As will be seen from FIG. 5, each lug 34, 35 or 36 is shaped arcuate having a depressed middle part 37 which is in contact with the side wall 21 or 22 and raised side parts 38 and 38 which are spaced from the side wall 21 or 22.

If desired, each apertured area of the major flat wall of the upper rail 30 may be provided with mutually facing two lugs. In this modification, one lug is in contact with the side wall 21 and the other lug is in contact with the other side wall 22.

As is seen from FIG. 1, the lock mechanism 50 of each slider unit 10a or 10b comprises the notches 29a formed in the lower rail 20, a locking lever 51 pivotally supported through a boss 32a by the side wall 32 of the upper rail 30, a pawl (not shown) carried by the locking lever 51 and latchingly engageable with the notches 29a and a biasing spring 58 for biasing the locking lever 51 in a direction to achieve the latching engagement between the pawl and the notches 29a.

The lock releaser 10c is of a generally U-shaped bar 55, which has leg portions 55 and 55 each being secured to a base portion of the pivotally supported locking lever 51. Denoted by numeral 57 is a handle portion of the bar 55, which is to be manipulated by an operator (viz., a seat occupant) when a change of the seat position is required by him or her.

In the following, operation of the seat slide device 10 will be described with reference to the drawings.

For ease of understanding, the description will be commenced with respect to a locked condition of the seat slide device 10.

Under this condition, the pawl of the locking lever 51 of each lock mechanism 55 is in engagement with selected one of the notches 29a of each lower rail 20. Thus, the upper rails 30 and thus the seat mounted thereon is locked relative to the lower rails 20.

When, as is seen from FIG. 2, the upper rail 30 is applied with a considerable load in the direction of the arrow A, a part of the load is received through the ball bearings 40 by the outward flange 24 of the lower rail 20, and the other part of the load is received through the middle lug 35 by the side wall 22 of the lower rail 20. It is to be noted that the load is also received by the parts of the other slider unit 10b. In the other slide unit 10b, however, the load is received by the side wall 21 of the lower rail 20 through two, that is, front and rear, lugs 34 and 36.

Thus, the seat mounted on the upper rails 30 is suppressed from making uncomfortable lateral play relative to the fixed lower rails 20.

When, for the purpose of changing the position of the seat, the handle portion 57 of the lock releaser 10c is raised by an operator (viz., a seat occupant) against the force of the springs 58, the pawl of the locking lever 51 of each lock mechanism 50 is disengaged from the notch 29a of the lower rail 20 thereby cancelling the locked condition of the seat relative to the fixed lower rails 20.

Thus, when, with the handle portion 57 kept raised, the seat is pushed forward or rearward, the same is moved forward or rearward on the lower rails 20. During this movement, the ball bearings 40 roll on the shallow guide grooves formed on the outward flanges 24 and 27 of each lower rail 20, smoothing the movement of the seat. Due to provision of the front, middle and rear lugs 34, 34a, 35, 35a, 36 and 36a, the movement is carried out without suffering from undesired lateral play of the seat.

When the seat is moved to a desired position, the handle portion 57 of the lock releaser 10c is released by the operator's hand. With this, the pawl of the locking lever 51 of each lock mechanism 50 is brought into engagement with a newly selected one of the notches 29a of each lower rail 20 by the force of the spring 58. Thus, the seat becomes locked at a new position.

What is claimed is:

1. A seat slide device comprising:
   a lower rail including a channel portion with first and second side walls;
   an upper rail including a major flat wall portion with first and second side walls longitudinally slidably disposed on said lower rail, said major flat wall portion facing said channel portion when said upper rail is properly disposed on said lower rail; and
   first and second lugs integrally formed with and projecting from said major flat wall portion of said upper rail into said channel portion of said lower rail, said first and second lugs being in contact with said inner surfaces of said first and second side walls of said lower rail, respectively, wherein each lug is shaped like a plate including a major surface, said major surface facing generally parallel the inner surface of said corresponding side wall of said lower rail for guiding said upper rail in relation to said lower rail.

2. A seat slide device as claimed in claim 1, in which each of said first and second lugs is provided by partially cutting a part of said major flat wall portion and bending said part in a given direction.

3. A seat slide device as claimed in claim 2, in which each lug is shaped arcuate having a depressed middle part which is in contact with the corresponding side wall of the lower rail and raised side parts which are spaced from the corresponding side wall.

4. A seat slide device as claimed in claim 3, in which said first and second lugs are positioned at longitudinally spaced different areas of said major flat wall portion of said upper rail.

5. A seat slide device as claimed in claim 4, further comprising a third lug which projects from said major flat wall portion and contacts with the inner surface of either one of said first and second side walls of said lower rail.

6. A seat slide device comprising:
a lower rail including a channel portion with first and second side walls;
an upper rail longitudinally slidably disposed on said lower rail, said upper rail having a major flat wall portion which faces said channel portion when said upper rail is properly disposed on said lower rail, wherein said lower and upper rails have at their laterally outer side flange portions slidably interlocked with each other; and
first and second lugs positioned at longitudinally spaced different areas of said major flat wall portion projecting from said major flat wall portion of said upper rail into said channel portion of said lower rail, said first and second lugs being located in the vicinity of inner surfaces of said first and second side walls of said lower rail, respectively, wherein
each of said first and second lugs is provided by partially cutting a part of said major flat wall portion and bending said part in a given direction;
said first and second lugs are shaped arcuate having a depressed middle part which is in contact with said inner surfaces of the first and second side wall of the lower rail and raised side parts which are spaced from the corresponding side wall;
a third lug which projects from said major flat wall portion and contacts with the inner surface of either one of said first and second side walls of said lower rail.

7. A seat slide device as claimed in claim 6, further comprising a plurality of ball bearings which are operatively disposed between said lower and upper rails for smoothing the sliding movement of said upper rail relative to said lower rail.

8. A seat slide device as claimed in claim 7, in which each of said lower and upper rails is formed with a guide way for guiding the movement of the ball bearings.

9. A seat slide device as claimed in claim 6, further comprising a lock mechanism which includes:
means defining a plurality of notches in the flange of said lower rail;
a locking lever pivotally supported by said upper rail, said locking lever having a pawl which is latchingly engageable with selected one of said notches; and
biasing means for biasing said locking lever in a direction to achieve the latching engagement between said pawl and said selected notch.

10. A seat slide device comprising:
two slider units which are substantially the same in construction and arranged in parallel with each other, each slider unit including:
a lower rail including a channel portion with first and second side walls,
an upper rail including a major flat wall portion with first and second side walls longitudinally slidably disposed on said lower rail, said major flat wall portion facing said channel portion when said upper rail is properly disposed on said lower rail;
first and second lugs integrally formed with and projecting from said major flat wall portion of said upper rail into said channel portion of said lower rail, said first and second lugs being in contact with inner surfaces of said first and second side walls of said lower rail, respectively wherein each lug is shaped like a plate including a major surface, said major surface facing the inner wall of the corresponding side wall of said lower rail;
two locking mechanisms constructed to lock the upper rails relative to the lower rails; and
a lock releaser incorporated with said two locking mechanisms and cancelling the locked condition of the upper rails when manipulated.

11. A seat slide device as claimed in claim 10, in which each slider unit further includes a third lug which is projected from said major flat wall portion of said upper rail into said channel portion of said lower rail, said third lug being located in the vicinity of the inner surface of one of said first and second side walls of said lower rail.

12. A seat slide device as claimed in claim 11, in which said lower and upper rails have at their laterally outer sides flange portions slidably interlocked with each other.

13. A seat slide device as claimed in claim 12, further comprising a plurality of ball bearings which are operatively disposed between said lower and upper rails for smoothing the sliding movement of said upper rail relative to said lower rail.

14. A seat slide device as claimed in claim 13, in which each of said lower and upper rails is formed with a guide way for guiding the movement of the ball bearings therealong.

15. A seat slide device as claimed in claim 14, in which each of said locking mechanisms comprises:
means defining a plurality of notches in the flange of said lower rail;
a locking lever pivotally supported by the upper rail, said locking lever having a pawl which is latchingly engageable with selected one of said notches; and
biasing means for biasing the locking lever in a direction to achieve the latching engagement between the pawl and the selected notch.

16. A seat slide device as claimed in claim 15, in which said lock releaser is of a generally U-shaped bar, which has leg portions respectively connected to the locking levers of the two locking mechanisms.

* * * * *